US011746214B2

(12) United States Patent
Courter et al.

(10) Patent No.: US 11,746,214 B2
(45) Date of Patent: *Sep. 5, 2023

(54) HIGH EFFICIENCY EROSION RESISTANT SILICONE ABLATOR COMPOSITION

(71) Applicant: THE BOEING COMPANY, Chicago, IL (US)

(72) Inventors: Kelly Jonathan Courter, Tustin, CA (US); Patrick Jacob Mobers, Long Beach, CA (US); Bryan Brewer, Newcastle, WA (US)

(73) Assignee: THE BOEING COMPANY, Arlington, VA (US)

( * ) Notice: Subject to any disclaimer, the term of this patent is extended or adjusted under 35 U.S.C. 154(b) by 147 days.

This patent is subject to a terminal disclaimer.

(21) Appl. No.: 17/231,980

(22) Filed: Apr. 15, 2021

(65) Prior Publication Data
US 2021/0395489 A1 Dec. 23, 2021

Related U.S. Application Data

(63) Continuation of application No. 16/387,033, filed on Apr. 17, 2019, now Pat. No. 11,174,370, which is a continuation of application No. 15/254,787, filed on Sep. 1, 2016, now Pat. No. 10,308,789, which is a continuation of application No. 14/317,920, filed on Jun. 27, 2014, now Pat. No. 9,458,356.

(51) Int. Cl.
| B64G 1/58 | (2006.01) |
| C08K 7/26 | (2006.01) |
| C09D 183/04 | (2006.01) |
| C08K 7/28 | (2006.01) |
| B29C 48/00 | (2019.01) |
| B64G 1/62 | (2006.01) |
| B29B 7/90 | (2006.01) |
| C08J 3/20 | (2006.01) |
| C08K 3/32 | (2006.01) |
| C08K 3/38 | (2006.01) |
| B29K 83/00 | (2006.01) |
| B29K 105/16 | (2006.01) |
| B29L 31/30 | (2006.01) |

(52) U.S. Cl.
CPC .................. C08K 7/26 (2013.01); B29B 7/90 (2013.01); B29C 48/022 (2019.02); B64G 1/58 (2013.01); B64G 1/62 (2013.01); C08J 3/203 (2013.01); C08K 3/32 (2013.01); C08K 3/38 (2013.01); C08K 7/28 (2013.01); C09D 183/04 (2013.01); B29K 2083/00 (2013.01); B29K 2105/16 (2013.01); B29L 2031/3076 (2013.01); C08J 2383/04 (2013.01); C08K 2003/322 (2013.01)

(58) Field of Classification Search
CPC ......... C08L 83/04; C09D 183/04; C08K 7/28; C08K 3/38; C08K 2003/387; C08K 2003/322; B64G 1/58
See application file for complete search history.

(56) References Cited

U.S. PATENT DOCUMENTS

| 3,317,455 | A | * | 5/1967 | Blome | C08K 7/26 521/154 |
| 3,755,223 | A | | 8/1973 | Engel | |
| 4,031,059 | A | | 6/1977 | Strauss | |
| 4,077,921 | A | | 3/1978 | Sharpe et al. | |
| 5,661,198 | A | | 8/1997 | Inatani et al. | |
| 5,905,101 | A | | 5/1999 | Fujiki et al. | |
| 6,486,233 | B1 | | 11/2002 | Wong et al. | |
| 6,627,697 | B2 | * | 9/2003 | Barney | C09D 183/04 524/588 |
| 9,458,356 | B2 | | 10/2016 | Courter et al. | |
| 9,527,609 | B2 | | 12/2016 | Courter | |
| 10,308,789 | B2 | * | 6/2019 | Courter | C08K 7/26 |
| 11,174,370 | B2 | * | 11/2021 | Courter | C08K 3/32 |
| 2009/0311468 | A1 | | 12/2009 | Thatcher et al. | |
| 2016/0369089 | A1 | | 12/2016 | Courter et al. | |

FOREIGN PATENT DOCUMENTS

| GB | 2276639 A | | 10/1994 |
| JP | 2003226877 | * | 8/2003 |
| JP | 2003226877 A | | 8/2003 |

* cited by examiner

Primary Examiner — Kuo Liang Peng
(74) Attorney, Agent, or Firm — Patterson + Sheridan, LLP

(57) ABSTRACT

A lightweight ablator formulation has been developed which offers superior thermal performance compared to current state of the art ablator formulations. The lightweight ablator formulations described herein typically include at least one endothermically decomposing (energy absorbing) material with a fluxing agent resulting in significantly reduced backface temperature response and a more stable surface. According to one implementation the ablator composition comprises about 30 to about 70 percent by weight of a base silicone resin, about 25 to about 67 percent by weight of a low-density filler, about 3 to about 7 percent by weight of a curing agent and greater than 0 and up to about 10 percent by weight of a boron-containing compound.

20 Claims, 4 Drawing Sheets

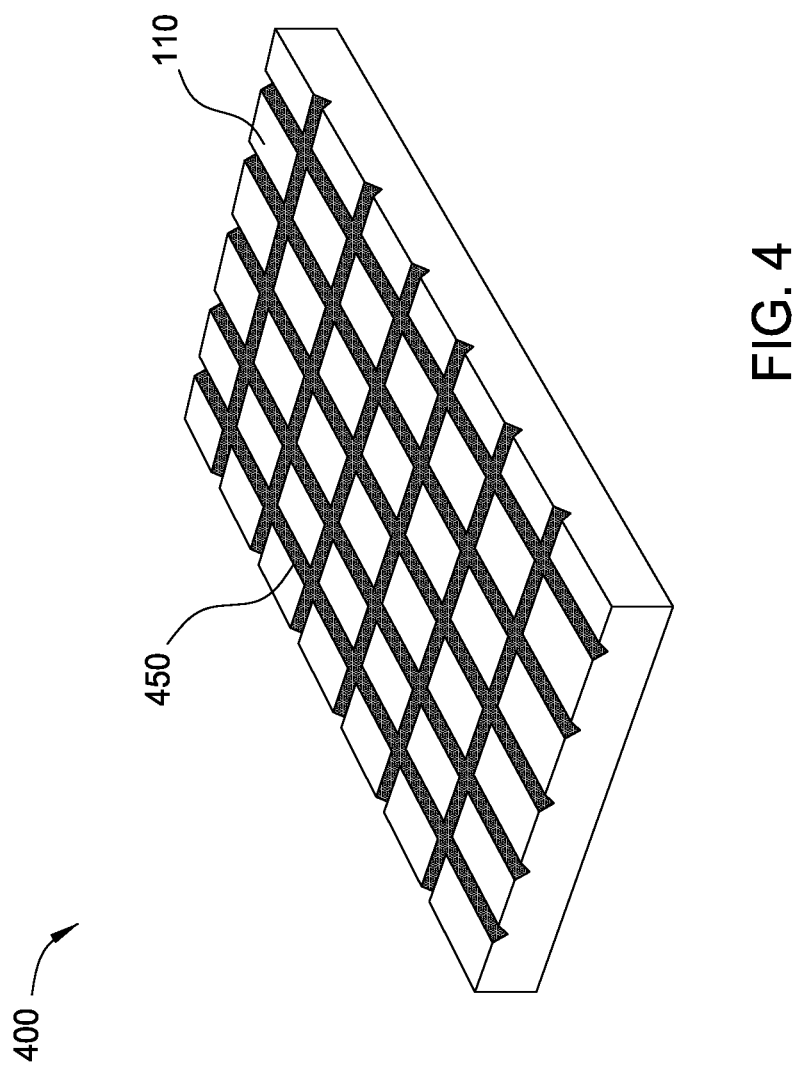

HIGH EFFICIENCY EROSION RESISTANT SILICONE ABLATOR COMPOSITION

RELATED APPLICATION

This application is a continuation of co-pending U.S. patent application Ser. No. 16/387,033, filed Apr. 17, 2019, which is a continuation of U.S. patent application Ser. No. 15/254,787, filed Sep. 1, 2016, now U.S. Pat. No. 10,308,789, which is a continuation of U.S. patent application Ser. No. 14/317,920, filed Jun. 27, 2014, now U.S. Pat. No. 9,458,356. The aforementioned related patent applications are herein incorporated by reference in their entirety.

FIELD

The implementations described herein generally relate to ablator compositions and more particularly to low-density yet highly durable ablator compositions and methods for mixing the compositions and forming ablative thermal protections systems.

BACKGROUND

Ablative materials have been used in a variety of applications to protect and insulate structures subjected to extreme thermal conditions. For example, many aerospace vehicles that traverse, exit, and enter the atmosphere of the Earth travel at high velocities, and as a result, their exterior aerosurfaces, and to some degree their substructure, experience high aerothermal loads. Aerothermal loads have been managed using a variety of techniques including insulation, radiant cooling, active cooling, conduction and convective cooling, and by phase change or ablative materials. Generally, ablative materials are applied to the affected aerosurfaces to absorb the extreme heat in order to insulate the vehicle from the thermal environment.

Known ablative materials comprise a variety of constituent components, each at certain percentages by weight or volume, to achieve a balance of thermal protection and other physical properties. Generally, ablator compositions are a composite material comprising a resin matrix with a variety of filler materials to reduce the overall density or provide other physical properties.

Known ablative materials typically have performance envelopes in which these known ablative compositions perform effectively. When exposed to heating or pressures in excess of these envelopes these known ablative compositions can erode rapidly, requiring excessive thickness (weight) of the material. When used in more benign environments, these known ablator compositions function as poor insulators, also requiring additional thickness.

Accordingly, there remains a need in the art for an ablator composition that is of low-density yet has high erosion resistance and durability before, during, and after high thermal loads, and which is relatively low cost and simple to fabricate.

SUMMARY

The implementations described herein generally relate to ablator compositions and more particularly to low-density yet highly durable ablator compositions and methods for mixing the compositions and forming ablative thermal protections systems. According to one implementation, an ablator composition for providing ablation protection after cure thereof is provided. The ablator composition comprises about 30 to about 70 percent by weight of a base silicone resin, about 25 to about 67 percent by weight of a low-density filler, about 3 to about 7 percent by weight of a curing agent and greater than 0 and up to about 10 percent by weight of a boron-containing compound.

In another implementation described herein, a method of forming an ablative structure is provided. The method comprises (a) forming an ablator composition, (b) forming the ablator composition into a geometrical shape, and (c) curing the geometrical shape. The ablator composition is formed by mixing about 30 to about 70 percent by weight of a base silicone resin, about 25 to about 67 percent by weight of a low-density filler, about 3 to about 7 percent by weight of a curing agent and greater than 0 and up to about 10 percent by weight of a boron-containing compound.

In yet another implementation described herein, a method of mixing a low-density ablator composition is provided. The method comprises (a) placing approximately 30 to about 70 percent by weight of a base silicone resin into a container, (b) mixing approximately 3-7 percent by weight of a curing agent with the base silicone resin, (c) mixing greater than 0 and up to about 10 percent by weight of a boron-containing compound with the resulting mixture of (b), and (d) mixing approximately 25-67 percent by weight of a low-density filler material with the resulting mixture of (c).

In yet another implementation, a substrate having an ablative coating formed thereon, wherein the ablative coating is formed by curing the ablative composition described below is provided.

BRIEF DESCRIPTION OF ILLUSTRATIONS

So that the manner in which the above-recited features of the present disclosure can be understood in detail, a more particular description of the disclosure briefly summarized above may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

FIG. 4 is a top view of scoring an ablator composition in accordance with implementations of the present disclosure.

To facilitate understanding, identical reference numerals have been used, wherever possible, to designate identical elements that are common to the Figures. Additionally, elements of one implementation may be advantageously adapted for utilization in other implementations described herein.

DETAILED DESCRIPTION

Figure 1:
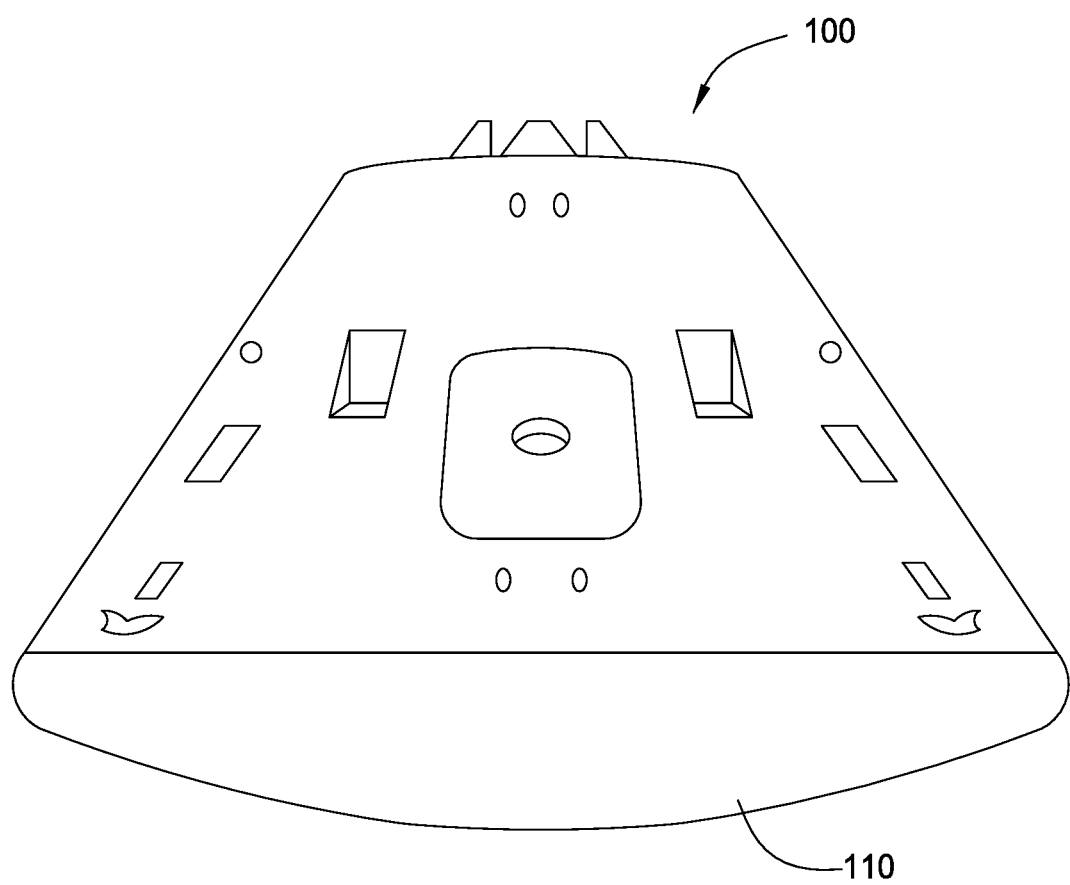
FIG. 1 is a perspective view of an aerospace vehicle making use of an ablator composition formed in accordance with implementations of the present disclosure.

The following disclosure describes ablator compositions and more particularly low-density yet highly durable ablator compositions and methods for mixing the compositions and forming ablative thermal protections systems. Certain details are set forth in the following description and in FIGS.

1-4 to provide a thorough understanding of various implementations of the disclosure. Other details describing well-known structures and systems often associated with ablator compositions and forming ablative thermal protection systems are not set forth in the following disclosure to avoid unnecessarily obscuring the description of the various implementations.

Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

A lightweight ablator formulation has been developed which offers superior thermal performance compared to current state of the art ablator formulations. The lightweight ablator formulations described herein typically include at least one endothermically decomposing (energy absorbing) material with a fluxing agent resulting in significantly reduced backface temperature response and a more stable surface. In some implementations, the ablative materials formed from the ablator formulations described herein take advantage of different heat dissipation mechanisms, improving thermal conductivity performance as well as reducing the weight of the ablative materials. In some implementations described herein, the ablator compositions cure at an elevated temperature. In some implementations described herein, the ablator compositions cure at room temperature.

Implementations described herein utilize endothermically decomposing materials in a silicone matrix to allow for generation of gaseous thermal decomposition products and their venting through the lightweight matrix without causing excessive matrix swelling or spalling. In some implementations, the silicone matrix may be porous. In some implementations, the endothermically decomposing material is a boron-containing compound. Exemplary boron containing compounds include boric acid and ammonium biborate. Not to be bound by theory but it is believed that boric acid provides both an endothermically decomposing material and fluxing agent, which allows the low-density filler material (e.g., silica glass microballoons) to fuse in the decomposition zone (e.g., the region where the virgin materials thermally decompose and become char) and create a network of glass reinforcement in the weak decomposition zone without the limitations of glass fiber reinforcement which may increase mastic stiffness making packing into core reinforcements difficult. In implementations where the endothermically decomposing material is boric acid, boric acid may provide a higher decomposition onset temperature than alternate boron sources (e.g., ammonium biborate) which enables the heat cure of the ablator composition on large vehicles instead of a room-temperature curing formulation that has a more limited work life. In some implementations, the ablator composition described herein enables the utilization of a lower thickness heat shield, resulting in lower vehicle weight, lower cost and/or higher payload mass.

In some implementations, the resulting ablator composition described herein has a low-density, approximately 0.3 to 0.6 g/cc (approximately 18.7 to 37.5 lb/ft$^3$). Further, the ablator composition described herein can withstand temperatures up to approximately 1650 degrees Celsius (3002 degrees Fahrenheit) while ablating slowly.

Referring to FIG. 1 an exemplary aerospace vehicle structure 100 is shown with an ablator composition 110 of the present disclosure applied to the exterior surfaces of the exemplary spacecraft. The exemplary aerospace vehicle structure 100 is shown flying through the atmosphere of the Earth, where high velocities create extremely elevated thermal loads across the exterior surface, or aerosurface, of the aerospace vehicle structure 100. Accordingly, the ablator composition provides thermal protection for the vehicle during these extreme thermal conditions. While the ablator composition is shown on a manned aerospace vehicle structure 100, it will be appreciated that the ablator composition and products containing the ablator composition are well suited for a variety of other manned and unmanned space vehicles that are expected to encounter high temperatures on their exterior surfaces during travel through the Earth's, or a planetary atmosphere. The ablator composition and products containing the ablator composition are potentially usable on other forms of vehicles, and possibly even on fixed (i.e., non-mobile) structures. The ablator composition may find use on virtually any form of mobile airborne platform or ground based vehicle, or possibly even on marine vehicles.

Figure 2:
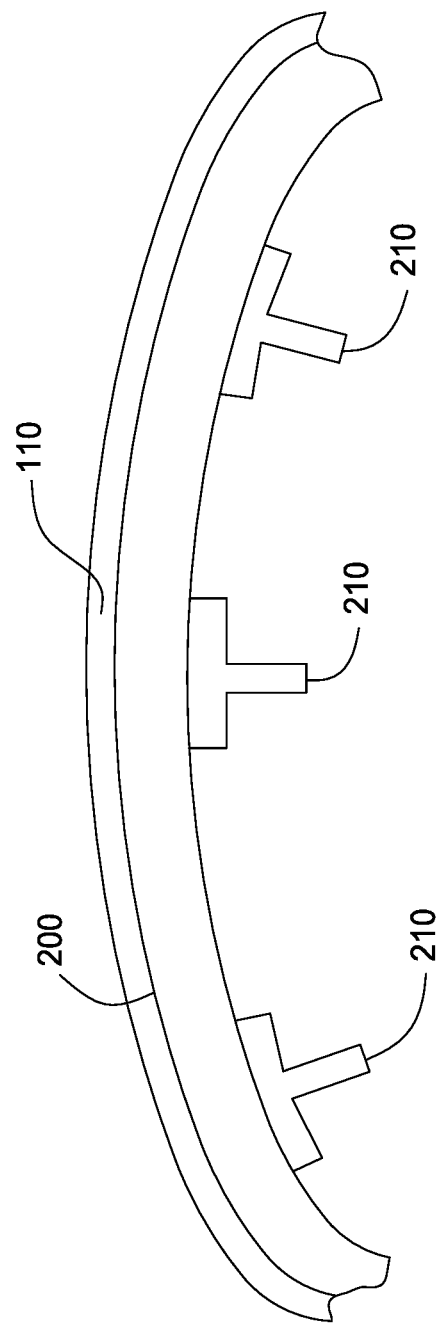
FIG. 2 is a cross-sectional view of an ablator compositions formed on a structure in accordance with implementations of the present disclosure.

Referring to FIG. 2, the ablator composition 110 is shown applied to a portion of the outer moldline (OML) 200 of the aerospace vehicle structure 100. In addition to protecting the OML 200, the ablator composition 110 further provides protection to substructure 210 adjacent the OML 200. Accordingly, additional structure and/or systems within close proximity of the OML 200 are protected from the extreme thermal environment by the ablator composition 110.

The application of the ablator composition 110 to an aerospace vehicle should not be construed as limiting; rather the application is merely illustrative of one structure and one operating environment in which the implementations of the present disclosure has particular utility. The ablator composition of the present disclosure can further be employed with a wide variety of structures and systems that must withstand high thermal loads for an extended duration.

In some implementations, the ablator composition 110 of the present disclosure generally comprises (1) a base silicone resin; (2) a curing agent; (3) a low-density filler material; (4) at least one endothermically decomposing material; (5) optionally a thinning fluid; and (6) other additives.

The silicone resin serves as a binder for the low-density filler material and is a secondary contributor to the thermal conductivity of the ablator composition 110. The silicone resins, which may be employed in the ablator composition 110, are typically non-elastomeric resins and, when cured, are highly cross-linked, relatively rigid inflexible solids, with the molecular chains linked through oxygen atoms. Such resins, when used in the ablator composition 110, may be cured, uncured or partially cured. One exemplary resin is a partially cured low molecular weight phenyl methyl polysiloxane resin sold by Dow-Corning of Midland, Mich., although other silicone resins may also be used. When uncured or partially cured silicone resins are used, curing is effected along with the silicone resin at room temperature by the curing agent for the silicone resin.

In some implementations, the base silicone resin comprises from about 20% to about 80% by weight of the ablator composition 110. In some implementations, the base silicone resin comprises from about 30% to about 70% by weight of the ablator composition 110. In some implementations, the base silicone resin comprises from about 40% to about 60% by weight of the ablator composition 110. In some implementations, the base silicone resin comprises from about 42% to about 50% by weight of the ablator composition 110.

The curing agent is added to the ablator composition to cause cross-linking of the polymer chains in the base silicone resin. The curing agents can be many different compounds known to a person skilled in the art.

In some implementations, the curing agent comprises from about 1% to about 15% by weight of the ablator composition 110. In some implementations, the curing agent comprises from about 1% to about 10% by weight of the ablator composition 110. In some implementations, the curing agent comprises from about 2% to about 7% by weight of the ablator composition 110. In some implementations, the curing agent comprises from about 3% to about 5% by weight of the ablator composition 110.

In some implementations, the weight ratio of base silicone/curing agent can be in the range between 8 and 12; in the range between 9.0 and 11.5; or in the range between 9.5 and 11; for example the ratio may be around 10. For example, about 10 g of silicone or between 9.8 g and 10.5 g of silicone can be mixed with about 1 g of curing agent or between 0.9 and 1.2 g of curing agent. The base monomer and the curing agent may be part of two-part silicone elastomer kit. Exemplary silicone elastomer kits include SYLGARD® 182 or SYLGARD® 184 Silicone Elastomer Kit available from the Dow Corning Corporation. SYLGARD® 182 may be used in ablator formulations where it is desirable to cure the ablator formulation at elevated temperatures. SYLGARD® 184 may be used in ablator formulations where it is desirable to cure the ablator formulation at room temperature.

The low-density filler material is generally used to reduce overall density of the ablator composition 110 and is a primary contributor to reducing thermal conductivity. In some implementations, the bulk density of the low-density filler material is between approximately 0.1 g/cc and 0.50 g/cc. In some implementations, the bulk density of the low-density filler material is between approximately 0.15 g/cc and 0.31 g/cc. The low-density filler material may have an average diameter from about 1 to about 200 μm; from about 5 to about 150 μm; or from about 10 to about 100 μm. Exemplary low-density filler materials include silica microballoons/microspheres, carbon microballoons, phenolic microballoons, or alumina microballoons.

The properties of the microballoons/microspheres that may contribute to the performance of the ablator composition 110 further comprise density and wall thickness. More specifically, the wall thickness of the microballoons according to some implementations of the present disclosure is between approximately 1.5 and 2.6 μm. Additionally, the bulk density of the microballoons in some implementations is between approximately 0.15 g/cc (9.5 lb/ft$^3$) and 0.31 g/cc (19.35 lb/ft$^3$).

In some implementations, the low-density filler material comprises from about 25% to about 67% by weight of the ablator composition 110. In some implementations, the low-density filler material comprises from about 25% to about 45% by weight of the ablator composition 110. In some implementations, the low-density filler material comprises from about 30% to about 40% by weight of the ablator composition 110.

The endothermically decomposing material functions to remove heat from the system as it decomposes. Exemplary endothermically decomposing materials include boron-containing compounds, phosphate salts and combinations thereof. The boron-containing compound may be selected from the group consisting of: boric acid and/or salts thereof (sodium borate, sodium tetraborate, or disodium tetraborate), ammonium biborate, and combinations thereof. Exemplary phosphate salts include ammonium phosphate (e.g., diammonium hydrogen phosphate.)

Boric acid may be used in implementations where the ablator composition 110 cures at an elevated temperature (e.g., approximately 200 degrees Fahrenheit or greater (93 degrees Celsius)). Ammonium biborate may be used in implementations where the ablator composition cures at a room temperature (e.g., approximately 68 degrees Fahrenheit (20 degrees Celsius)).

In some implementations where boric acid and/or salts thereof are present, boric acid and/or salts thereof may comprise greater than 0 and up to about 10% by weight of the ablator composition 110. In some implementations where boric acid and/or salts thereof are present, boric acid and/or salts thereof may comprise from about 0.1% to about 10% by weight of the ablator composition 110. In some implementations where boric acid and/or salts thereof are present, boric acid and/or salts thereof comprise from about 1% to about 10% by weight of the ablator composition 110. In some implementations where boric acid and/or salts thereof are present, boric acid and/or salts thereof comprise from about 2% to about 8% by weight of the ablator composition 110. In some implementations where boric acid and/or salts thereof are present, boric acid and/or salts thereof comprise from about 3% to about 5% by weight of the ablator composition 110.

In some implementations where ammonium biborate is present, ammonium biborate may comprise greater than 0 and up to about 10% by weight of the ablator composition 110. In some implementations where ammonium biborate is present, ammonium biborate may comprise from about 0.1% to about 10% by weight of the ablator composition 110. In some implementations, ammonium biborate may comprise from about 1% to about 10% of the ablator composition 110. In some implementations where ammonium biborate is present, ammonium biborate may comprise from about 2% to about 8% by weight of the ablator composition 110. In some implementations where ammonium biborate is present, ammonium biborate may comprise from about 3% to about 5% by weight of the ablator composition 110.

In some implementations where ammonium phosphate dibasic is present, ammonium phosphate may comprise 10% or less of the ablator composition 110. In some implementations, ammonium phosphate may comprise from about 0.1% to about 10% of the ablator composition 110. In some implementations, ammonium phosphate may comprise from about 1% to about 10% of the ablator composition 110. In some implementations where ammonium phosphate is present, ammonium phosphate may comprise from about 2% to about 8% by weight of the ablator composition 110. In some implementations where ammonium phosphate is present, ammonium phosphate may comprise from about 3% to about 5% by weight of the ablator composition 110.

Optionally a thinning fluid/solvent is added to adjust the viscosity of the base silicone resin according to the forming method being used. The amount and type of thinning fluid used is typically dependent on the forming method used. In some implementations, the thinning fluid also polymerizes and contributes to the strength and ablation resistance of the ablator composition. In some implementations, the thinning fluid may act as an inhibitor that further extends the pot-life of the ablator composition 110.

For example, for the molded form of the ablator composition, the thinning fluid may be a polydimethylsiloxane (silicone oil) based thinning fluid such as Dow Corning® 200 fluid, supplied by the Dow Corning Corporation. In another example, for the sprayed form of the ablator composition 110, one exemplary thinning fluid is a volatile methylsiloxane (VMS) thinning fluid such as Dow Corning® OS-10 fluid commercially available from the Dow Corning Corporation. Other exemplary thinning fluids include SYLGARD® 527 A&B Silicone Dielectric Gel or SYLGARD® 537 One Part Dielectric Gel available from the Dow Corning Corporation. SYLGARD® 537 may be used in ablator formulations where it is desirable to cure the ablator formulation at elevated temperatures. SYLGARD® 527 may be used in ablator formulations where it is desirable to cure the ablator formulation at room temperature. Other thinning fluids that provide the desired viscosity for the specific application of the ablator composition 110 may also be used.

In some implementations, the thinning fluid comprises about 20% or less of the ablator composition 110. In some implementations where the thinning fluid is present, the thinning fluid may comprise 10% or less of the ablator composition 110. In some implementations, the thinning fluid may comprise 5% or less of the ablator composition 110. In some implementations, the thinning fluid comprises from about 0% and up to about 20% by weight of the ablator composition 110. In some implementations, the thinning fluid comprises greater than 0% and up to about 20% by weight of the ablator composition 110. In some implementations, the thinning fluid comprises from about 0.1% to about 20% by weight of the ablator composition 110. In some implementations, the thinning fluid comprises from about 1% to about 15% by weight of the ablator composition 110. In some implementations, the thinning fluid may comprise from about 1% to about 10% of the ablator composition 110. In some implementations, the thinning fluid may comprise from about 1% to about 5% by weight of the ablator composition 110. In some implementations, the thinning fluid may comprise from about 2% to about 4% by weight of the ablator composition 110.

In some implementations, the ablator composition of the present disclosure may further comprise additional additives. The additional additives may comprise filler materials. Exemplary additional filler materials include fiber filler materials and/or powder filler materials. The filler may comprise, for example, an oxide ceramic such as silica ($SiO_2$), alumina ($Al_2O_3$), mullite ($Al_2O_3$—$SiO_2$), titanium dioxide ($TiO_2$), or silicon carbide (SiC), wherein the fillers provide additional mechanical properties to the ablator composition. Other fiber fillers such as carbon may also be used; however, the RF transparency of the material will be adversely affected.

In some implementations where titanium dioxide ($TiO_2$) is present, titanium dioxide may comprise 10% or less of the ablator composition 110. In some implementations, titanium dioxide may from about 0% to about 10% of the ablator composition 110. In some implementations, titanium dioxide may comprise from about 2% to about 8% by weight of the ablator composition 110. In some implementations, titanium dioxide may comprise from about 5% to about 7% by weight of the ablator composition 110.

In some implementations where silicon carbide is present, silicon carbide may comprise 10% or less of the ablator composition 110. In some implementations, silicon carbide may comprise 5% or less of the ablator composition 110. In some implementations, silicon carbide may comprise from about 0% to about 10% of the ablator composition 110. In some implementations, silicon carbide may comprise from about 2% to about 8% by weight of the ablator composition 110. In some implementations, silicon carbide may comprise from about 5% to about 7% by weight of the ablator composition 110.

The ablator composition of the present disclosure may be fabricated or mixed for application by first mixing the liquid resin components. The prescribed percent by weight of base silicone resin is added to a container. Next, in implementations where a thinning fluid is used, the prescribed percent by weight of thinning fluid is added. Then the prescribed percent by weight of curing agent/catalyst is added. The combination of the base silicone resin, the optional thinning fluid, and the cuing agent are then thoroughly mixed to ensure that the components are uniformly dispersed.

Next, heavier solids such as the boron containing components (e.g., boric acid, ammonium biborate), ammonium phosphate and silicon carbide (if present) are added and mixed. Prior to addition, the boric acid may be sieved to achieve a certain particle size. The boron-containing compound may be added slowly to avoid clumping. Next, ammonium phosphate dibasic crystals are added to the mixture. Additional solids (e.g., silicon carbide, titanium dioxide, etc.) may be added at this time also. The mixture, including the solids, is then thoroughly mixed to ensure that the components are uniformly dispersed.

After addition of the heavier solids, the microballoons are added and mixed with the resin. Initially, the mixture, including the microballoons may be mixed in short pulses to wet the microballoons followed by continuous mixing until a uniform resin/filler blend is attained. The mixing time may be minimized to reduce the possibility that the microballoons will crush. Accordingly, a variety of manufacturing techniques can be used to fabricate the final ablative structure.

Exemplary forming methods of the ablator composition 110 comprise manual application to a surface, open and closed die molding, spraying, troweling, vacuum forming, extrusion and manual application, although other methods commonly known in the art may also be used. The ablator composition 110 may be formed into a geometrical shape using any of the aforementioned methods. The ablator composition 110 may either be co-bonded with the structure that is to be protected or secondarily bonded thereon. With spraying, the bond between the ablator composition 110 and the structure is typically created simultaneously with the spraying operation and secondary bonding is generally not required. However, a coupling agent may be applied to the structure to further strengthen the bond of the ablator composition 110 with the structure when using spraying methods. Alternately, the coupling agent may be used to strengthen the bond of the ablator composition 110 with the structure with other forming methods such as a molded composition that is co-bonded. Exemplary spraying methods further comprise, but are not limited to, single nozzle, multiple nozzle, convergent spraying, and other spraying methods commonly known in the art. Moreover, the ablator composition 110 may be mixed within the spray system rather than being pre-mixed prior to application. The ablative structure may be post-formed to control the thickness and surface finish.

After forming, the ablator composition 110 is preferably subjected to a heat cure. In some implementations where the ablator composition 110 cures at an elevated temperature of at least approximately 65.6 degrees Celsius (150 degrees Fahrenheit) and no more than approximately 149 degrees Celsius (300 degrees Fahrenheit) for approximately one (1) hour to four hours. In some implementations, where the ablator composition 110 cures at an elevated temperature of approximately 93 degrees Celsius (200 degrees Fahrenheit) for approximately 3.5 hours. However, the specific cure cycle will depend on the geometry of the part, the specific composition, and the associated tooling, among others. For example, a typical cure cycle for a 14"×24"×1" flat molded panel of the ablator composition is approximately 121 degrees Celsius (250 degrees Fahrenheit) for approximately two (2) hours. Additionally, the ablator composition will cure at room temperature, however, the cure time ranges between approximately four (4) to ten (10) days and may be prohibitive in a high production environment. Other heating methods commonly known in the art, including but not limited to, microwave, autoclave, and others may also be used to cure the ablator composition 110 according to the present disclosure. In addition, the ablative structure may further be post formed and subjected to a further cure cycle to control the thickness and the surface finish thereof.

Depending on the forming method, the viscosity of the ablator composition 110 may be varied to provide for sufficient wetting of the microballoons and ease of fabrication. With manual application, or troweling, the dynamic viscosity of the ablator composition 110 in one form is approximately between $10^4$ Pa-s and $10^5$ Pa-s. For instance, the trowelable mixture does not flow under its own weight at room temperature and has a paste or grout-like consistency. Additionally, the viscosity for spraying is somewhat lower than that of the trowelable mixture yet somewhat higher than that of the raw materials.

Figure 3:
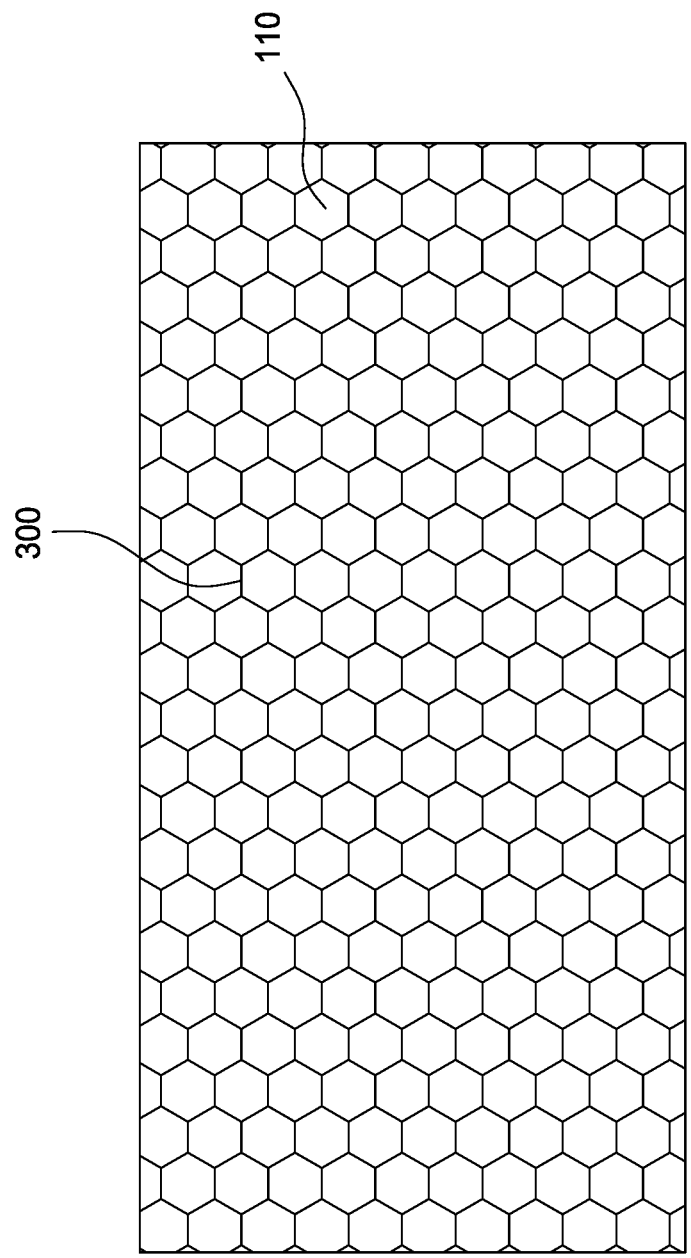
FIG. 3 is a top view of a honeycomb core embedded in an ablator composition in accordance with implementations of the present disclosure.

Referring to FIG. 3, the ablator composition described above can be reinforced to provide additional structural properties by integrating a honeycomb core 300 within its composition. In one exemplary method, a layer of the ablator composition 110 is placed throughout a cavity of a mold and a piece of honeycomb core 300 is placed over and subsequently pressed into the ablator composition 110. Alternately, a layer of the ablator composition 110 is placed in the cavity of the mold, followed by the honeycomb core 300, and then followed by another layer of the ablator composition 110.

In another exemplary method, the honeycomb core 300 is bonded to a structure first with a film adhesive. The bond is physically and visually verified, and then the ablator composition 110 is packed into the open face of the honeycomb core 300 and cured.

With the honeycomb core implementation of the present disclosure, the forming method may be closed-die molding where the material is either vacuum bagged or placed into a hot press to ensure the honeycomb core 300 is uniformly filled with the ablator composition 110. In one form, the material is preferably cured at approximately 149 degrees Celsius (300 degrees Fahrenheit) for approximately one hour. The honeycomb core 300 may be a phenolic fiberglass material; however, other honeycomb core materials commonly known in the art may also be incorporated with the ablator compositions 110 according to the properties that are desired.

In addition to the honeycomb core 300, alternate reinforced implementations comprise a two-dimensional woven material or a non-woven material as the reinforcement member. Accordingly, the reinforcement may comprise continuous or discontinuous fiber forms commonly known in the art. Similar to the honeycomb implementations, the two-dimensional woven and non-woven reinforced structures comprise the reinforcement impregnated with the ablator composition 110. The resulting structure may be formed using a variety of manufacturing techniques, such as the manual troweling method previously described in connection with the honeycomb core reinforcement implementations. Benefits of reinforcement with the honeycomb core 300 and the alternate reinforced implementations include char retention and crack suppression.

Referring to FIG. 4, the surface of an ablative structure described above can further be "scored" to suppress surface cracking during and after heat exposure. The scoring 450 may comprise a regular pattern of surface indentation, approximately 0.254 cm (0.10 in.) in depth and at a spacing of approximately 2.54 cm (1 inch), which is created prior to or after curing the ablative structure. As will be appreciated by those skilled in the art, the depth and spacing of scoring 450 may vary according to specific materials and performance requirements. Moreover, alternate patterns other than the square grid scoring as illustrated may also be employed.

EXAMPLES

Aspects and advantages of the embodiments described herein are further illustrated by the following examples. The particular materials and amounts thereof, as well as other conditions and details, recited in these examples should not be used to limit the embodiments described herein. Examples of the present disclosure are identified by the letter "E" followed by the sample number while comparative samples, which are not examples of the present disclosure are designated by the letter "C" followed by the sample number. All parts and percentages are by weight unless otherwise indicated.

A description of the raw materials used in the examples is as follows:

| | |
|---|---|
| Ammonium biborate | Available from SIGMA-ALDRICH ® as ammonium biborate tetrahydrate (($NH_4$)$_2B_4O_7$•$4H_2O$). |
| Boric Acid | Available from SIGMA-ALDRICH ®. |
| ammonium phosphate dibasic | Available from SIGMA-ALDRICH ®. |
| Eccospheres ® SI-200 | Hollow thin-walled glass microballoons composed mainly of silica (>95% $SiO_2$) and having a particle diameter ranging from 5 to 150 microns, commercially available from Trelleborg AEM. |
| SYLGARD ® 182 Silicone | A one-part silicone elastomer commercially available from the Dow Corning Corp. |
| SYLGARD ® 184 Silicone | A two-part silicone elastomer kit that includes both the silicone resin and the curing agent and is commercially available from the Dow Corning Corp. |
| SYLGARD ® 527 A&B Silicone | A two-part silicone elastomer kit that includes both the silicone resin and the curing agent and is commercially available from the Dow Corning Corp. |

SYLGARD® 537 One Part Dielectric Gel A one-part, clear, heat cure, low viscosity gel.

Exemplary formulations used for producing the ablator composition are given in Table I. Comparative Example #1 (C1) is a formulation for a low density, room temperature curing ablator formulation. Comparative Example #2 (C2) is a formulation for a high density, room temperature curing ablator formulation. Example #1 (E1) is a formulation for a low density, long out-time ablator formulation. Example #2 (E2) is a formulation for a medium density, long out-time ablator formulation. Example #3 (E3) is a formulation for a high density, long out-time ablator formulation. Example #4 (E4) is a formulation for a medium density, room temperature curing ablator formulation. Example #5 (E5) is a formulation for a low density, long out-time ablator formulation including ammonium biborate. Example #6 (E6) is a formulation for a medium density, long out-time ablator formulation including ammonium biborate.

(approximately 18.7 to 37.5 $lb/ft^3$), which is relatively low compared to ablator compositions of the known art. In addition, the ablator composition described herein has high erosion resistance and durability. The ablator composition described herein has been tested under high Mach conditions and has withstood temperatures up to approximately 1650 degrees Celsius (3002 degrees Fahrenheit) with near zero recession in low Earth orbit entry heating environments. In addition, the room temperature thermal conductivity of the ablator composition is relatively low at approximately 0.13 W/m-K.

Further preliminary testing has shown that the ablator composition described herein has a tensile strength greater than approximately 689 kPa (100 $lb/in^2$) (e.g., from about 689 kPa (100 $lb/in^2$) up to about 2068 kPa (300 $lb/in^2$)). Variations on properties of the ablator composition described herein may vary according to the constituent elements contained therein, and therefore, the properties

TABLE I

Table I. Formulations:

| Component | C1 | C2 | E1 | E2 | E3 | E4 | E5 | E6 |
|---|---|---|---|---|---|---|---|---|
| Ammonium Biborate | | | | | | | 3.42 | 4.02 |
| Boric Acid | | | 3.42 | 4.02 | 4.55 | 4.02 | 3.42 | 4.02 |
| Ammonium Phosphate Dibasic | | | 3.42 | 4.02 | 4.55 | 4.02 | | |
| Eccospheres ® SI-200 | 46.0 | 27.6 | 43.7 | 33.8 | 25.0 | 33.8 | 43.7 | 33.8 |
| Silicon Carbide Powder | | | | | | | | |
| SYLGARD ® 182 Base | | | 42.5 | 49.7 | 56.3 | | 42.5 | 49.7 |
| SYLGARD ® 182 Curing Agent | | | 4.25 | 4.97 | 5.63 | | 4.25 | 4.97 |
| SYLGARD ® 184 Base | 36.2 | 46.9 | | | | 49.7 | | |
| SYLGARD ® 184 Curing Agent | 3.62 | 4.69 | | | | 4.97 | | |
| SYLGARD ® 527 part A | 7.1 | 10.45 | | | | 1.7 | | |
| SYLGARD ® 527 part B | 7.1 | 10.45 | | | | 1.7 | | |
| SYLGARD 537 | | | 2.8 | 3.5 | 3.9 | | 2.8 | 3.5 |
| Total | 100 | 100 | 100 | 100 | 100 | 100 | 100 | 100 |

Test Methods:

Thermal performance of the disclosed ablator formulation was demonstrated by exposure to heating in the NASA Johnson Space Center Atmospheric Reentry Materials and Structures Evaluation Facility (ARMSEF) 'arc jet facility' at conditions representative of atmospheric entry from low earth orbit. The test coupons were axisymmetric with a 4 inch (10.16 cm) diameter and a 2 inch (5.08 cm) height. The 4 inch radius curvature of the forward face creates an Iso-Q surface meaning that under arcjet heating conditions, the forward surface of the model should experience nearly uniform heat flux. Two test coupon configurations were used. The first test configuration had an instrumented thermocouple plug for measuring in-depth temperature response and a second test coupon configuration with just a bondline thermocouple, positioned at the interface between the ablative material and the substrate (e.g., aluminum or composite material bonded to the backside)

The various test formulations of the ablator composition were exposed to nominal and max heat rate entry heating conditions representative of low Earth orbit entry for a manned capsule.

Results:

Test coupons including the disclosed ablator formulation exhibited significantly reduced backface temperature and swelling/splitting under nominal entry heating conditions relative to test coupons including known compositions.

In some implementations, the density of the ablator composition described herein is approximately 0.3 to 0.6 g/cc disclosed herein are merely exemplary and shall not be construed as limiting the scope of the present disclosure.

In preliminary high flow rate testing against commercially available ablative materials, the ablator composition described herein consistently delivered low backface temperatures, low char density, and excellent char durability. Accordingly, the ablator composition described herein has improved thermal properties, erosion resistance, and durability over various other ablator compositions of the known art, while providing low-density and low cost thermal protection.

Inclusion of boric acid in the ablator composition may allow the silica glass microballoon filler to fuse in the decomposition zone creating a network of glass reinforcement in the weaker decomposition zone without the effects of glass fiber reinforcement increasing the weight or density. It has been found that using boric acid provides multiple advantages including cooling and providing a boron source.

While the foregoing is directed to embodiments of the present disclosure, other and further embodiments of the present disclosure may be devised without departing from the basic scope thereof, and the scope thereof is determined by the claims that follow.

What is claimed is:

1. A reinforced ablator structure, comprising:
   an ablator composition, comprising:
     about 30 to about 70 percent by weight of a base silicone resin;

about 25 to about 67 percent by weight of a low-density filler having a bulk density between approximately 0.1 g/cc and 0.50 g/cc;

about 3 to about 7 percent by weight of a curing agent;

about 3 to about 10 percent by weight of a boron-containing compound; and about 3 to about 10 percent by weight of ammonium phosphate dibasic; and a honeycomb core integrated with the ablator composition.

2. The reinforced ablator structure of claim 1, wherein the boron-containing compound is selected from boric acid and salts thereof, ammonium biborate, or a combination thereof.

3. The reinforced ablator structure of claim 2, wherein the boron-containing compound is boric acid and salts thereof and is present from about 3 to about 5 percent by weight.

4. The reinforced ablator structure of claim 1, wherein the ammonium phosphate dibasic is present from about 3 to about 5 percent by weight.

5. The reinforced ablator structure of claim 1, wherein the ablator composition further comprises greater than 0 and up to about 20 percent by weight of a thinning fluid.

6. The reinforced ablator structure of claim 1, wherein the low-density filler comprises silica microballoons.

7. The reinforced ablator structure of claim 1, wherein the density of an ablator material formed by curing the ablator composition ranges between at least 0.3 and about 0.6 g/cc.

8. The reinforced ablator structure of claim 1, wherein the ablator composition is uncured.

9. The reinforced ablator structure of claim 1, wherein the honeycomb core comprises a phenolic resin material.

10. A vehicle comprising the reinforced ablator structure of claim 1.

11. The vehicle of claim 10, wherein the vehicle comprises manned or unmanned space vehicles, mobile airborne vehicles, ground based vehicles, or marine vehicles.

12. A method of making a reinforced ablator structure, comprising:

integrating a honeycomb core with an ablator composition, wherein the ablator composition comprises:

about 30 to about 70 percent by weight of a base silicone resin;

about 25 to about 67 percent by weight of a low-density filler having a bulk density between approximately 0.1 g/cc and 0.50 g/cc;

about 3 to about 7 percent by weight of a curing agent;

about 3 to about 10 percent by weight of a boron-containing compound; and about 3 to about 10 percent by weight of ammonium phosphate dibasic.

13. The method of claim 12, wherein integrating the honeycomb core with the ablator composition comprises:

depositing a layer of the ablator composition in a cavity of a mold; and pressing a piece of the honeycomb core into the ablator composition.

14. The method of claim 12, wherein integrating the honeycomb core with the ablator composition comprises:

bonding the honeycomb core to a structure;

packing the ablator composition into an open face of the honeycomb core; and curing the honeycomb core and the ablator composition.

15. The method of claim 14, further comprising scoring the honeycomb core prior to curing the honeycomb core and the ablator composition.

16. The method of claim 12, wherein integrating the honeycomb core with the ablator composition comprises a closed-die molding process.

17. The method of claim 12, further comprising adjusting the viscosity of the ablator composition by adding greater than 0 and up to about 20 percent by weight of a thinning fluid to the ablator composition.

18. The method of claim 12, wherein the boron-containing compound is selected from boric acid and salts thereof, ammonium biborate, or a combination thereof.

19. The reinforced ablator structure of claim 12, wherein the boron-containing compound is boric acid and salts thereof and is present from about 3 to about 5 percent by weight.

20. The reinforced ablator structure of claim 12, wherein the ammonium phosphate dibasic is present from about 3 to about 5 percent by weight.

* * * * *